United States Patent
Katoh et al.

(10) Patent No.: US 8,339,400 B2
(45) Date of Patent: Dec. 25, 2012

(54) GRAPHIC DISPLAY METER

(75) Inventors: Hiroshi Katoh, Aichi (JP); Kenichi Nagahashi, Shizuoka (JP)

(73) Assignees: Yazaki Corporation, Tokyo (JP); Toyota Jidosha Kabushiki Kaisha, Toyota-shi (JP)

( * ) Notice: Subject to any disclaimer, the term of this patent is extended or adjusted under 35 U.S.C. 154(b) by 1151 days.

(21) Appl. No.: 11/812,802

(22) Filed: Jun. 21, 2007

(65) Prior Publication Data

US 2007/0296724 A1  Dec. 27, 2007

(30) Foreign Application Priority Data

Jun. 27, 2006  (JP) .................................. 2006-176354

(51) Int. Cl.
*G06T 11/00* (2006.01)
(52) U.S. Cl. .................................... 345/440.2
(58) Field of Classification Search ................ 345/440.2
See application file for complete search history.

(56) References Cited

U.S. PATENT DOCUMENTS

| | | | | |
|---|---|---|---|---|
| 5,442,737 A | * | 8/1995 | Smith | 345/639 |
| 7,441,189 B2 | * | 10/2008 | Michaels | 715/700 |

FOREIGN PATENT DOCUMENTS

| | | | |
|---|---|---|---|
| JP | 2002-15335 | | 1/2002 |
| JP | 2003-137007 | * | 5/2003 |
| JP | 2003-233828 | | 8/2003 |
| JP | 2003-262542 | | 9/2003 |

OTHER PUBLICATIONS

Japanese patent office website PAJ translation of JP 2003-262542.*

* cited by examiner

*Primary Examiner* — Jeffery A Brier
(74) *Attorney, Agent, or Firm* — Kratz, Quintos & Hanson, LLP

(57) ABSTRACT

The object of the invention is to provide an improved graphic display meter which is prevented from causing inconvenience to the vehicle operator, when a motion blur display mode is switched to a normal display mode.
When a motion blur pointer image 10 is switched to a normal pointer image 20a, multiple pointer images 20 including the normal pointer image 20a are displayed adjacent to or in abutment with a leading part of the motion blur pointer image 10 in a direction where the pointer is rotating. The multiple pointer images 20 are consisted of the normal pointer image 20a and a plurality of auxiliary pointer images 20b, which are aligned with one another and are positioned in close proximity to the normal pointer image 20a. The multiple pointer images 20, a plurality set of which have been stored as data in advance, are selected on the basis of a space between the motion blur pointer image 10 prior to the switching of the pointer image and the normal pointer image 20 after the switching of the pointer image.

3 Claims, 3 Drawing Sheets

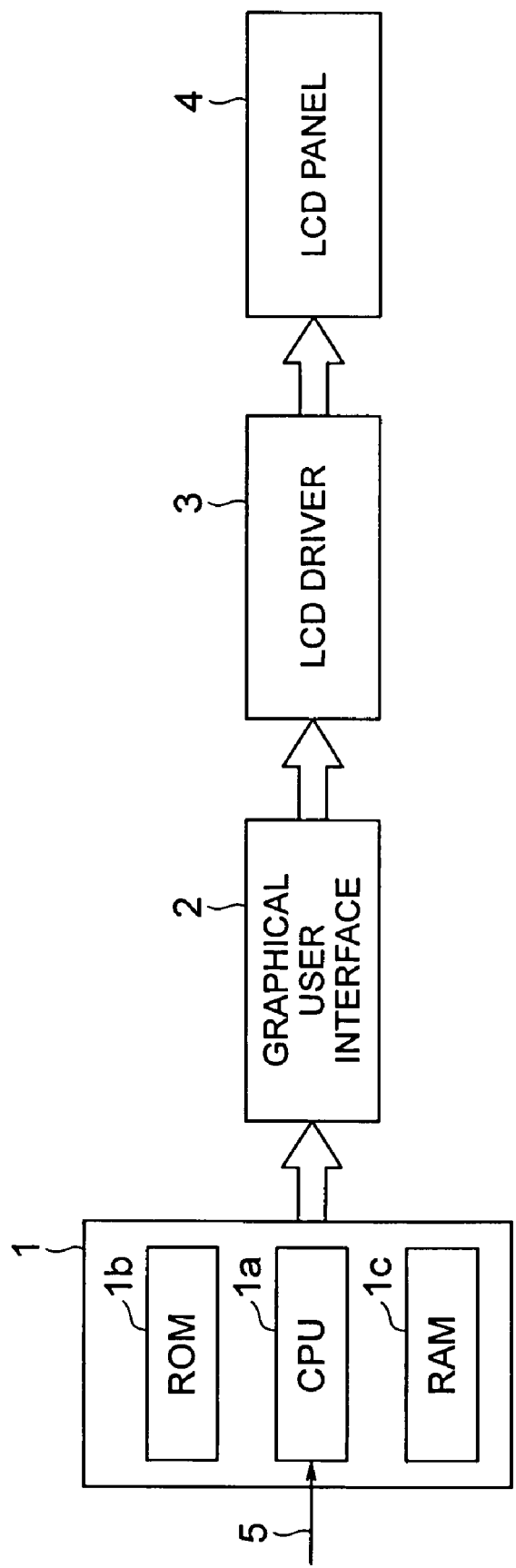

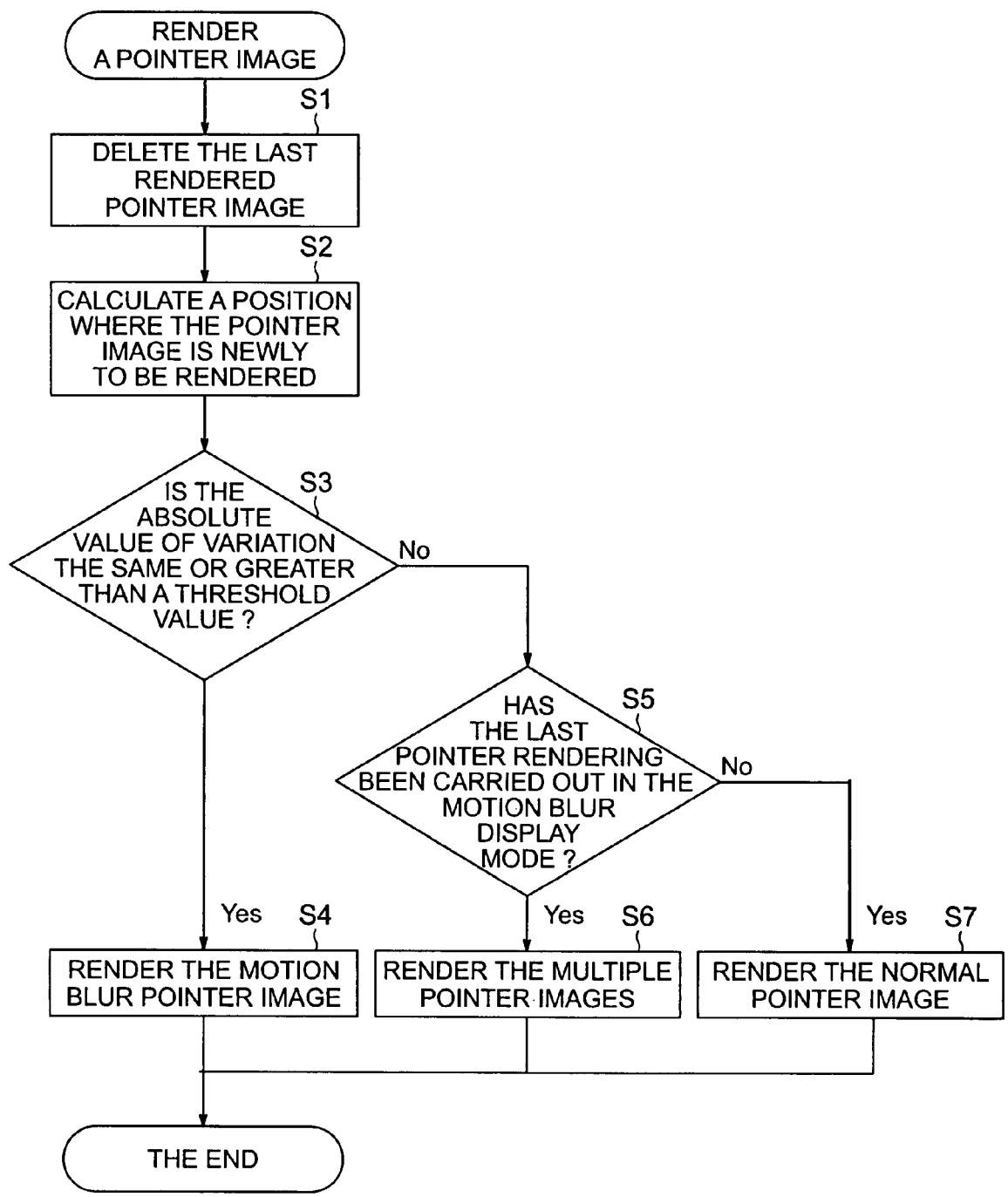

GRAPHIC DISPLAY METER

CROSS-REFERENCE TO RELATED APPLICATIONS

The present Application claims priority to Japanese Patent Application No. 2006-176354 filed Jun. 27, 2006, the entire disclosure of which, including the specification and drawings, is expressly incorporated herein by reference.

BACKGROUND OF THE INVENTION (1) Field of the Invention

The present invention relates to a graphic display meter for providing graphical vehicle driving related information, by displaying a dial and a pointer on a display device thereof such as a liquid crystal display (LCD) in the form of a dot matrix. Accordingly, the present invention is particularly suitable for use with an automotive vehicle.

(2) Description of the Related Art

In conventional graphic display meters, in a case where the pointer is driven to rotate rapidly, too many images of the pointer including its after-images are displayed thereon, causing inconvenience to a vehicle user. To solve the above discussed problem, there has been proposed a graphic display meter which is disclosed, for example, in Japanese Patent Application Publication No. 2003-262542. The conventional graphic display meter as suggested is designed such that it can represent a shadow on the opposite side to the side where the pointer is rotating, when the pointer rotates at a speed greater than a predetermined speed.

This type of meter can eliminate a multiplicity of after-images and is adapted to present fast-moving images, when dynamically varying images are made to be displayed. In addition to above discussed technology, both Japanese Patent Application Publication No. 2002-15335 and Japanese Patent Application Publication No. 2003-233828 also disclose a similar technology to the disclosure provided in Japanese Patent Application Publication No. 2003-262542, so called a "motion blur" technology.

In the afore-mentioned graphic display meter, while the pointer is preferably to be displayed by using the motion blur technology in a case where it is made to move at a high rate of speed, otherwise (i.e., when it is either stopped or moving at a decreased speed), it is necessary to display a normal pointer image in order to ensure that the information, which is provided by the pointer, such as actual vehicle speed and engine speed is clearly displayed. For this reason, the motion blur display mode has to be switched to the normal display mode, and vice versa.

As such, the motion blur display mode is used when the pointer moves too fast to be recognizable to a vehicle operator, and has to be switched to the normal display mode when the pointer moves slow enough that the pointer is recognizable to the vehicle operator. However, a difficulty is encountered when the motion blur display mode is switched to the normal display mode. The pointer is still moving at a speed ranging between the stopped state and the afore-mentioned high speed, resulting in a gap in dependence on the moving speed difference of the pointer between the normal display mode and the motion blur display mode.

As a result, at the time of the afore-mentioned mode changes, the vehicle operator recognizes both the motion blur pointer image and the normal pointer image at the same time, and also recognizes a space between the normal pointer image and the motion blur pointer image, which causes inconvenience to the vehicle operator.

In view of the above problems in the conventional arts, the present invention has an object to provide an improved graphic display meter which is prevented from causing inconvenience to the vehicle operator, when the motion blur display mode is switched to the normal display mode.

SUMMARY OF THE INVENTION

According to one embodiment, there is provided a graphic display meter for displaying a pointer rotating about a dial on a display device thereof. In this graphic display meter, a motion blur pointer image is displayed in a case where a pointer rotation speed is the same or greater than a predetermined value, a normal pointer image is displayed in a case where the pointer rotation speed is less than the predetermined value, and multiple pointer images where a plurality of the pointer images are aligned with one another are displayed adjacent to or in abutment with a leading part of the motion blur pointer image in a direction where the pointer is rotating, when the motion blur pointer image is switched to the normal pointer image.

According to an another embodiment, the previously mentioned graphic display meter is characterized in that the multiple pointer images are selected from a plurality of image data on the basis of a space between the normal pointer image after the switching of the pointer image and the motion blur pointer image prior to the switching of the pointer image, and then are displayed.

According to a yet another embodiment, there is provided a graphic display meter for displaying a pointer rotating about a dial on a display device thereof. In this graphic display meter, a motion blur pointer image is displayed in a lighter color than a normal pointer image in a case where the pointer rotation speed is the same or greater than a predetermined value, the normal pointer image is displayed in a case where the pointer rotation speed is less than the predetermined value, multiple pointer images where a plurality of the pointer image are aligned with one another are displayed adjacent to or in abutment with a leading part of the motion blur pointer image in a direction where the pointer is rotating, when the motion blur pointer image is switched to the normal pointer image, and each of the multiple pointer images intervening between the motion blur pointer image and the normal pointer image gradually grows darker from the motion blur pointer image side toward the normal pointer image side.

BRIEF DESCRIPTION OF THE DRAWINGS

FIG. 1 is a schematic block diagram of a vehicle indicator equipped with an exemplary graphic display meter in accordance with an embodiment of the present invention.

FIG. 2 is a flow chart showing the steps of a method of controlling a display in the vehicle indicator of FIG. 1.

Figure 3A:
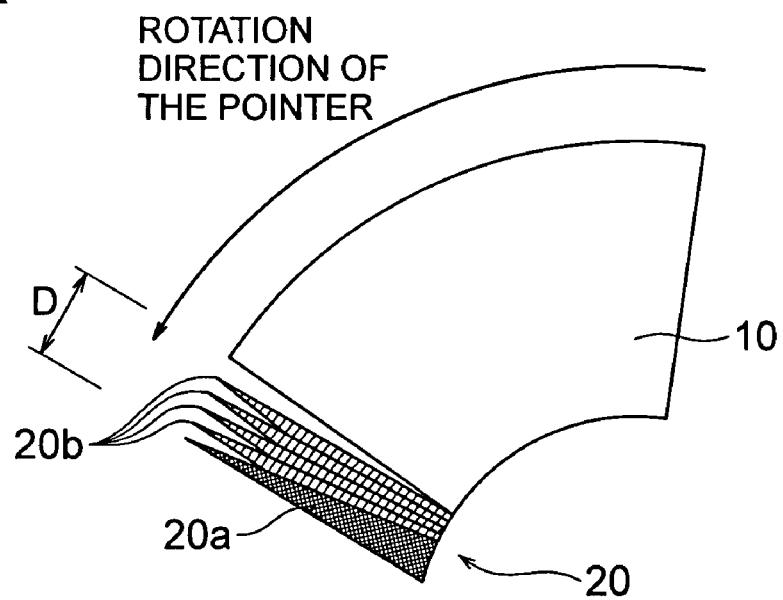
FIGS. 3A and 3B are illustrations of an exemplary display of the vehicle indicator of FIG. 1

The foregoing summary, as well as the following detailed description of certain embodiments of the present invention, will be better understood when read in conjunction with the appended FIGS. 1 to 3. For the purpose of illustrating the invention, there is shown in the drawings, certain embodiments. It should be understood, however, that the present invention is by no means limited by the appended drawings.

DESCRIPTION OF THE PREFERRED EMBODIMENTS

Figure 3B:
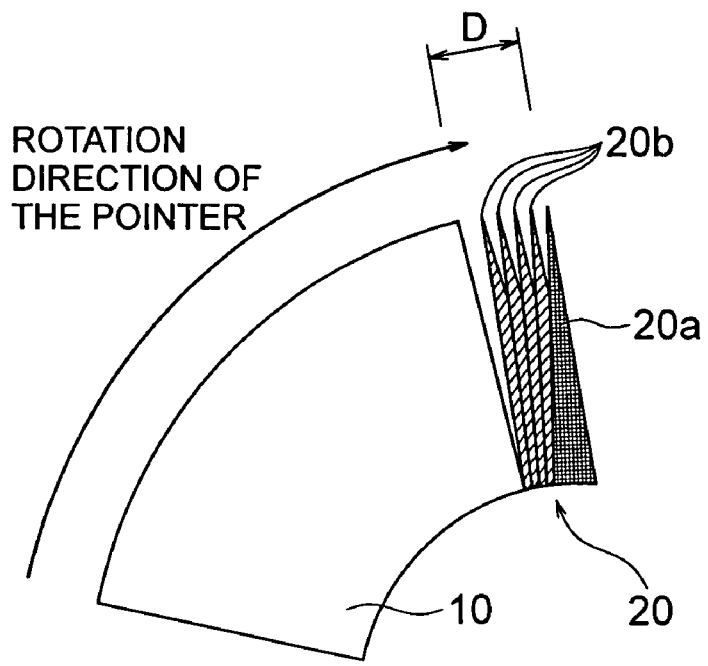

An exemplary graphic display meter in accordance with the present invention is discussed in further detail below with reference to the accompanying drawings. Specifically, FIG. 1 is a schematic block diagram of a vehicle indicator equipped with an exemplary graphic display meter in accordance with an embodiment of the present invention; FIG. 2 is a flow chart showing the steps of a method of controlling a display in the vehicle indicator of FIG. 1; and each of FIGS. 3A and 3B is an illustration of an exemplary display of the vehicle indicator of FIG. 1

Referring now to FIG. 1, there is provided a vehicle indicator, which is comprised of a microcomputer 1, a graphical user interface 2, a LCD driver 3, and a LCD panel 4 for presenting graphical driving information and used as a graphic display device. The microcomputer 1 may include CPU 1a for operating a variety of programmed processes or controls, ROM 1b for storing programs to be operated by CPU 1a, and RAM 1c for storing a variety of data and having a working area needed for the operation processed by CPU. In ROM 1b, "stop" image data of a gauge or a dial having a substantially round or circular face, a plurality of pointer image data having a position coordinate presenting a rotation angle of the pointer rotating about the dial, and a plurality set of multiple pointer images comprising a plurality of the pointer images aligned with one another, are stored in advance. In addition, a threshold value (i.e., a predetermined value) is stored in ROM 1b for comparison with the pointer rotation speed.

The microcomputer 1 is configured to generate various image data from a variety of vehicle detection signals inputted via a data bus, and send the image data to the LCD panel 4 through the graphical user interface 2 and the LCD driver 3, in order to present a speedometer for indicating a vehicle speed, a tachometer for indicating an engine speed, and a fuel gauge for presenting fuel level information to users, as a image on a screen of the LCD panel 4. There will hereinafter be illustrated the tachometer for indicating the engine speed in dependence on the signal of the vehicle engine speed.

On the screen of the LCD panel 4, the dial having substantially round face is displayed as a stop image, and dynamic images of the pointer, which is made to rotate about the dial depending on the vehicle engine speed, are displayed. The dial is provided with, for example, a black-colored dial face (i.e. background), white-colored markings on the scale, and a red-colored pointer. When pointer rendering is done, the image display mode switch is carried out per unit time T0 (1/60 second) on the basis of rotation angle (i.e. rotation value) data each of which is sampled every unit time T0. A current rotation angle data thus obtained is stored in RAM 1c as buffer storage. The pointer rendering is done on the basis of the last rotation angle data. Because the image display mode switch is, for example, carried out every 1/60 second (i.e. 1 unit time), even if a delay of 1 unit time occurs in relation with real-time, a vehicle operator cannot recognize this delay.

When the pointer image is displayed on the basis of the last rotation angle data during the procedure of obtaining the current rotation angle data, the difference in the position coordinate (i.e., the rotation speed of the pointer) is calculated on the basis of the rotation angle difference between the current rotation angle value and the last rotation angle value. Based on the rotation speed of the pointer thus obtained, selection and operation of the pointer image data are carried out. In this regard, in a case where the pointer rotation speed is less than the predetermined value, the normal display mode is selected for displaying the pointer image. On the other hand, in a case where the pointer rotation speed is the same or greater than the predetermined value, the motion blur display mode is selected for displaying the pointer image. When the motion blur display mode is switched to the normal display mode, the multiple pointer images are selected from ROM 1b, on the basis of the rotation angle difference between the rotation angle of the normal pointer image after the switching of the pointer image and the rotation angle of the motion blur pointer image prior to the switching of the pointer image. As shown in FIG. 2, the previously mentioned switching step is carried out repeatedly per the afore-mentioned unit time T0. This type of display is also designated as "rendering" in the CPU 1a processing.

Referring now to FIG. 2, the flow chart is indicative of a subroutine for pointer rendering process, which is carried out by inputting the rotation angle data corresponding to the engine speed per unit time T0. In step S1, CPU 1a deletes the last rendered pointer image, which may be one of normal pointer image, multiple pointer images and motion blur pointer image, and calculates a position where the pointer image is newly to be rendered in this time in step S2. Subsequently, in step S3, variation is calculated from the difference between the last rotation angle data and the current rotation angle data, and the absolute value of the variation is compared with the threshold value. In this regard, if the absolute value of the variation is the same or greater than the threshold value, the pointer image is rendered in the motion blur display mode in step S4.

If the absolute value of the variation is less than the threshold value in the step S3, it is determined whether the last pointer rendering has been carried out in the motion blur display mode or not in step S5. In a case where the last pointer rendering has been carried out in the motion blur display mode, multiple pointer images will be rendered in step S6. In a case where the last pointer rendering has not been carried out in the motion blur display mode, the normal pointer image will be rendered in step S7.

As such, an exemplary display is provided in FIGS. 3A and 3B. More specifically, FIG. 3A is an exemplary illustration of a case where the engine speed drops dramatically. FIG. 3B is an exemplary illustration of a case where the engine speed rises dramatically. In this regard, an aftermost frame (i.e., a frame displaying the last rotation angle value data) is indicated by a sectoral motion blur pointer image 10, and a frame (i.e., a frame displaying the current rotation angle value data) next to the aftermost frame is indicated by the multiple pointer images 20. The multiple pointer images 20 are consisted of the normal pointer image 20a and a plurality of auxiliary pointer images 20b, which are aligned with one another and are positioned in close proximity to the normal pointer image 20a. Further, the normal pointer image 20a is the same color as usual, and a plurality of auxiliary pointer images 20b are, for example, colored lighter than the normal pointer image 20a.

In the multiple pointer images 20, the normal pointer image 20a is to be displayed after the motion blur pointer image 10 being displayed. Accordingly, the multiple pointer images 20 are positioned adjacent to or in abutment with a leading part of the motion blur pointer image 10 in a direction where the pointer is rotating. Based on the space D between the normal pointer image 20a and the motion blur pointer image 10, there may be selected and provided the multiple pointer images 20.

Referring now to FIGS. 3A and 3B, each multiple pointer images 20, 20 are placed in asymmetrical relationship. In other words, the multiple pointer images 20 are arranged such that the normal pointer image 20a is placed farthest away from the motion blur pointer image 10. As discussed above, the multiple pointer images 20 will be selected and determined in dependence on the rotation direction of the pointer and the space D between the normal pointer image 20 and the motion blur pointer image 10, causing a load on operations performed by CPU to lessen.

The color of the pointer may be as follows. For example, the normal pointer image 20a of the multiple pointer images 20 is colored as usual, the motion blur pointer image 10 is colored lighter than the normal pointer image 20a, and a plurality of auxiliary pointer images 20b of the multiple pointer images 20 gradually grow darker from the motion blur pointer image 10 side toward the normal pointer image 20a side. If possible, in the multiple pointer images 20, each of auxiliary pointer images 20b is respectively displayed independently of the normal pointer image 20a, and gradually grows darker from the motion blur pointer image 10 side toward the normal pointer image 20a side.

It is desired that the motion blur pointer image 10 or the multiple pointer images 20 be displayed to get more transparent from a center side toward a radial side on the dial, allowing for more realistic expression thereof. It is also preferable to color the motion blur pointer image 10 or the multiple pointer images 20 in monochrome in order to lessen the complexity during coloring process.

In previously discussed embodiments, to determine when to switch the motion blur pointer image to the multiple pointer images, and when to switch the normal pointer image to the motion blur pointer image, the pointer rotation speed (i.e., variation) is usually compared with one threshold value. Two threshold values can be also utilized to determine the best timing for changing the afore-mentioned display modes. In this regard, there are provided the first threshold value for determining the best timing for switching the motion blur pointer image to the multiple pointer images and the second threshold value for determining the best timing for switching the normal pointer image to the motion blur pointer image.

In accordance with the first embodiment, since multiple pointer images where a plurality of the pointer images are aligned with one another are displayed adjacent to or in abutment with a leading part of the motion blur pointer image in a direction where the pointer is rotating, when the motion blur pointer image is switched to the normal pointer image, in the case of being viewed by a vehicle operator, the motion blur pointer image and the normal pointer image seem to be arranged consecutively with each other by the presence of the multiple pointer images intervening therebetween. Accordingly, the vehicle operator can be prevented from feeling inconvenience while the motion blur display mode is switched to the normal display mode.

In accordance with the second embodiment, the multiple pointer images are easily to be displayed corresponding to the space between the motion blur pointer image and the normal pointer image.

In accordance with the third embodiment, since multiple pointer images where a plurality of the pointer image are aligned with one another are displayed adjacent to or in abutment with a leading part of the motion blur pointer image in a direction where the pointer is rotating, when the motion blur pointer image is switched to the normal pointer image, in the case of being viewed by a vehicle operator, the motion blur pointer image and the normal pointer image seem to be arranged consecutively with each other by the presence of the multiple pointer images intervening therebetween. Accordingly, the vehicle operator can be prevented from feeling inconvenience while the motion blur display mode is switched to the normal display mode. In addition to the afore-mentioned advantageous effect, the vehicle operator can hardly recognize the space between the motion blur pointer image and the normal pointer image, when the motion blur pointer image is switched to the normal pointer image.

While above description is provided for the tachometer of the vehicle indicator, it also applies to a vehicle speedometer and so on.

While multiple embodiments have been presented in the foregoing detailed description, it should be appreciated that a vast number of variations exist. It should also be appreciated that the exemplary embodiments are only examples, and are not intended to limit the scope, applicability, or configuration of the invention in any way. For example, while the embodiment utilizes LCD panel as a display device, organic electroluminescence displays or plasma displays can be also utilized as the display device.

Further, while the foregoing embodiments describes the vehicle indicator for allowing for the improved driving environment by way of example only, the present invention is not considered limited to the specific embodiment chosen for purposes of illustration. In other words, the present apparatus can be applied to a variety of indicators other than the vehicle indicator.

What is claimed is:

1. A graphic display meter for displaying a pointer image rotating about a dial on a display device thereof, the pointer image being displayed on the basis of rotation angle data, comprising:
   (a) a motion blur pointer image mode in which a motion blur pointer image is displayed when the pointer rotation speed is equal to or greater than a predetermined value;
   (b) a normal pointer image mode in which a normal pointer image is displayed when the pointer rotation speed is less than the predetermined value; and
   (c) a multiple pointer image mode in which a plurality of auxiliary pointer images and the normal pointer image are actively displayed between the motion blur pointer image displayed, which is based on the last rotation angle data, and the normal pointer image to be displayed, which is based on the current rotation angle data, when the pointer rotation speed decreases from equal to or greater than the predetermined value to less than the predetermined value, the plurality of auxiliary pointer images being aligned with each other.

2. The graphic display meter according to claim 1, wherein the multiple pointer images are selected from a plurality of image data on the basis of a gap between the motion blur pointer image displayed, which is based on the last rotation angle data, and the normal pointer image to be displayed, which is based on the current rotation angle data.

3. A graphic display meter for displaying a pointer image rotating about a dial on a display device thereof, the pointer image being displayed on the basis of rotation angle data, comprising:
   (a) a motion blur pointer image mode in which a motion blur pointer image is displayed when the pointer rotation speed is equal to or greater than a predetermined value;
   (b) a normal pointer image mode in which a normal pointer image is displayed when the pointer rotation speed is less than the predetermined value, the normal pointer image being darker than the motion blur pointer image in color; and
   (c) a multiple pointer image mode in which a plurality of auxiliary pointer images and the normal pointer image are actively displayed between the motion blur pointer image displayed, which is based on the last rotation angle data, and the normal pointer image to be displayed, which is based on the current rotation angle data, when the pointer rotation speed decreases from equal to or greater than the predetermined value to less than the predetermined value, the plurality of auxiliary pointer images being aligned with each other, and growing darker in color in a direction from the motion blur image side toward the normal pointer image side.

\* \* \* \* \*